(12) United States Patent
Herold et al.

(10) Patent No.: US 12,673,610 B2
(45) Date of Patent: Jul. 7, 2026

(54) HEADLIGHT SYSTEM FOR VEHICLES

(71) Applicant: Hella GmbH & Co. KGaA, Lippstadt (DE)

(72) Inventors: Florian Herold, Bielefeld (DE);
Alexander Klarius, Lippstadt (DE);
Ulrich Knaack, Paderborn (DE);
Susanne Koehler, Lippstadt (DE);
Alexander Schwan, Kamen (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 157 days.

(21) Appl. No.: 18/296,409

(22) Filed: Apr. 6, 2023

(65) Prior Publication Data

US 2023/0311762 A1     Oct. 5, 2023

Related U.S. Application Data

(63) Continuation of application No. PCT/EP2021/077247, filed on Oct. 4, 2021.

(51) Int. Cl.
B60Q 11/00 (2006.01)
B60Q 1/00 (2006.01)
F21S 41/663 (2018.01)

(52) U.S. Cl.
CPC .......... B60Q 11/005 (2013.01); B60Q 1/0023 (2013.01); F21S 41/663 (2018.01)

(58) Field of Classification Search
CPC ..... B60Q 11/005; B60Q 1/0023; F21S 41/663
USPC ....................................................... 340/458
See application file for complete search history.

(56) References Cited

U.S. PATENT DOCUMENTS

| | | | | |
|---|---|---|---|---|
| 4,948,249 A | * | 8/1990 | Hopkins | G01M 11/064 |
| | | | | 356/121 |
| 5,164,785 A | * | 11/1992 | Hopkins | G01M 11/064 |
| | | | | 356/121 |
| 5,526,145 A | * | 6/1996 | Weber | G02B 5/203 |
| | | | | 430/1 |
| 6,281,631 B1 | * | 8/2001 | Schaffer | H05B 39/10 |
| | | | | 315/307 |
| 9,423,602 B1 | * | 8/2016 | Dolgoff | H04N 13/324 |

(Continued)

FOREIGN PATENT DOCUMENTS

| DE | 102015207530 A1 | 10/2016 |
|---|---|---|
| DE | 102018211977 A1 | 1/2019 |

(Continued)

*Primary Examiner* — Brian A Zimmerman
*Assistant Examiner* — Thang D Tran
(74) *Attorney, Agent, or Firm* — Husch Blackwell LLP

(57) ABSTRACT

A headlamp system is provided for vehicles with an imaging unit and with an optical unit. The optical unit generates a light distribution that features a plurality of light patches. The light patches are each generated by mapping of at least one light pixel of the imaging unit. An actuator unit includes a corrective mechanism, by which, in event of presence of a defective light pixel that cannot be mapped by the optical unit on a light patch, at least one corrective light pixel is actuated, by means of which a light patch adjacent to the defective light patch not illuminated by the defective light pixel features a changed intensity progression in comparison to non-defective state. At least one flight patch adjacent to the defective light patch features an increased corrective intensity progression in comparison to the non-defective state.

15 Claims, 3 Drawing Sheets

(56) References Cited

U.S. PATENT DOCUMENTS

| | | | | |
|---|---|---|---|---|
| 9,576,377 B1* | 2/2017 | Yett | H04N 13/365 | |
| 9,840,186 B2* | 12/2017 | Ichikawa | H05B 45/10 | |
| 10,416,548 B1* | 9/2019 | Yett | G03B 21/562 | |
| 2003/0107898 A1* | 6/2003 | Smith | B60Q 11/00 | |
| | | | 362/465 | |
| 2004/0032675 A1* | 2/2004 | Weller | B60R 1/12 | |
| | | | 359/872 | |
| 2004/0184279 A1* | 9/2004 | Molto | B60Q 11/00 | |
| | | | 362/507 | |
| 2005/0118706 A1* | 6/2005 | Pirrung | C07D 317/62 | |
| | | | 435/287.1 | |
| 2007/0262334 A1* | 11/2007 | Chiang | H01L 25/0753 | |
| | | | 257/E33.059 | |
| 2009/0190323 A1* | 7/2009 | Watanabe | B60Q 1/143 | |
| | | | 362/466 | |
| 2011/0007280 A1* | 1/2011 | Patterson | G08B 7/066 | |
| | | | 340/584 | |
| 2011/0012510 A1* | 1/2011 | Tani | B60Q 1/1423 | |
| | | | 315/82 | |
| 2011/0133645 A1* | 6/2011 | Kuo | H05B 45/395 | |
| | | | 315/121 | |
| 2013/0099127 A1* | 4/2013 | Atzinger | G01T 1/2928 | |
| | | | 250/371 | |
| 2013/0169155 A1* | 7/2013 | Nakashima | B60Q 1/14 | |
| | | | 315/82 | |
| 2014/0145612 A1* | 5/2014 | Takagaki | B60Q 1/1423 | |
| | | | 315/82 | |
| 2014/0247456 A1* | 9/2014 | Horstmann | G01B 9/02095 | |
| | | | 356/502 | |
| 2014/0254188 A1* | 9/2014 | Masuda | F21S 45/70 | |
| | | | 362/521 | |

| | | | | |
|---|---|---|---|---|
| 2015/0024968 A1* | 1/2015 | Rulison | G02B 13/0085 | |
| | | | 506/12 | |
| 2015/0070926 A1* | 3/2015 | Stefanov | F21S 41/663 | |
| | | | 362/538 | |
| 2016/0126434 A1* | 5/2016 | Nakabayashi | H10H 20/857 | |
| | | | 257/91 | |
| 2016/0191794 A1* | 6/2016 | Varonos | H04N 23/698 | |
| | | | 348/36 | |
| 2016/0215947 A1* | 7/2016 | Matsuno | F21S 41/176 | |
| 2017/0138545 A1* | 5/2017 | Minor | F21K 9/60 | |
| 2017/0210280 A1* | 7/2017 | Suzuki | F21S 41/663 | |
| 2017/0261173 A1* | 9/2017 | Suzuki | F21S 41/285 | |
| 2018/0058653 A1* | 3/2018 | Alisafaee | F21S 41/151 | |
| 2018/0147978 A1* | 5/2018 | Reisinger | F21S 41/675 | |
| 2018/0184495 A1* | 6/2018 | Pelz | B60Q 11/00 | |
| 2018/0224082 A1* | 8/2018 | Reinprecht | F21S 41/176 | |
| 2018/0247585 A1* | 8/2018 | Kanayama | H01L 25/0753 | |
| 2019/0031087 A1* | 1/2019 | Kim | B60Q 11/005 | |
| 2019/0072252 A1* | 3/2019 | Moser | F21S 41/68 | |
| 2019/0359131 A1* | 11/2019 | Wama | B60R 11/04 | |
| 2020/0109822 A1* | 4/2020 | Kim | F24F 13/10 | |
| 2020/0240607 A1* | 7/2020 | Ehlert | H05B 47/29 | |
| 2021/0097260 A1* | 4/2021 | Verma | G06V 10/449 | |
| 2021/0223664 A1* | 7/2021 | Maharshi | G06T 1/20 | |
| 2022/0099268 A1* | 3/2022 | Albou | F21S 41/18 | |
| 2022/0128209 A1* | 4/2022 | Fischer | F21S 41/153 | |
| 2022/0252454 A1* | 8/2022 | Schlueter | G01J 3/2803 | |
| 2022/0307668 A1* | 9/2022 | Mochizuki | F21S 41/12 | |
| 2022/0341785 A1* | 10/2022 | Akagawa | G01N 21/35 | |

FOREIGN PATENT DOCUMENTS

| | | | |
|---|---|---|---|
| DE | 102019101710 A1 | 7/2020 | |
| FR | 3062217 A1 | 7/2018 | |
| WO | 2019/014480 A1 | 1/2019 | |

* cited by examiner

HEADLIGHT SYSTEM FOR VEHICLES

CROSS REFERENCE

This application claims priority to PCT Application No. PCT/EP2021/077247, filed Oct. 4, 2021, which itself claims priority to German Application No. 10 2020 126491.7, filed Oct. 9, 2020, the entireties of both of which are hereby incorporated by reference.

FIELD OF THE INVENTION

The invention involves a headlamp system for vehicles with an imaging unit and an optical unit for generating a light distribution that features a plurality of illuminated light patches, where the light patches are generated by mapping at least one light pixel of the imaging unit, with an actuator unit for actuating the imaging unit, where the actuator unit features corrective mechanism by means of which the presence of a defective light pixel, that cannot be mapped by the optical unit on a light patch, at least one corrective light pixel is actuated by means of which light patches adjacent to the defective light patch not illuminated by the defective light pixel feature a changed corrective intensity progression in comparison to a non-defective state.

The invention relates to a method for compensating for defective light pixels of a headlamp for vehicles, where light pixels are each mapped by means of an optical unit to light patches of a light distribution that form by overlapping an illumination field of a light distribution such that other light pixels are actuated in such a way that contrast between a defective light patch and a light patch adjacent to the same is reduced.

BACKGROUND OF THE INVENTION

A headlamp system for vehicles is known from DE 2019 101 710 A1 that features an imaging unit and an optical unit for generating a specified light distribution. The imaging unit can feature light sources arranged in the form of a matrix and a liquid crystal unit or a micromirror unit. The light emitted by the imaging unit is mapped by means of an optical unit to a light distribution that consists of a plurality of light patches preferentially designed to be the same size. Each of the light patches is generated by mapping of a light pixel of the imaging unit such that by individually actuating the light pixels a high resolution light distribution can be mapped, for instance an anti-glare high-beam distribution. An actuator unit acting on the imaging unit features corrective mechanism such that in the event of the presence of a defective light pixel (faulty light pixel) any dark light patch caused by it is corrected. For this purpose, corrective light pixels that are mapped on the light patches adjacent to the defective light patch are actuated as being dimmed so that the adjacent light patches feature a lower light intensity. An advantage of this is being able create a smooth transition from the defective light patch to the adjacent correct light patches. A disadvantage of the known headlamp system is, however, that the defective light patch continues to appear dark and even enlarged which does not significantly reduce the perception of pixel defects.

Glasses with an integrated display (head-mounted display) is known from WO 2019/014480 A1, which features a light source unit comprising a large number of light pixels, an optical unit and a representation field. The optical unit comprises a mirror pivotable at a high frequency that deflects the light pixels onto the representation field. The representation field is in direct proximity to a human eye. On the representation field, light patches are represented by rows and columns, where redundant capacity is created by several rows or several light patches being generated by the same light pixel. An actuator unit for actuating the light source unit features such corrective mechanism that in the event of the presence of a defective light pixel (faulty light pixel), the adjacent light pixels emitting light of the same color are actuated at an increased illuminance. The fact that the mirror directs a series of light sources to different areas of the representation field makes it possible to create a compensation for the defective light patch. This presupposes, however, a redundancy capacity of the light patch generated on the redundancy field, as each of the light patches is illuminated by actuating several light pixels. Such redundant capacity is, however, not expedient in vehicle headlamps as the effort involved would be too great. In particular, it would be difficult to generate a light distribution that masks out other traffic objects.

BRIEF SUMMARY OF THE INVENTION

The task of the present invention is consequently to refine a headlamp system for vehicles in such a way that disruptive dark patches in a light distribution that are caused by the failure of individual light pixels can be reduced as far as possible.

To solve this task, an optical unit is designed in such a way that the intensity of the respective light patch is formed by overlapping of a first light portion that is generated by the light pixel, the light of which is mapped through the optical unit onto the light patch and a second light portion that is generated by at least one light pixel, the light of which is mapped through the optical unit onto an adjacent light patch and in that the corrective mechanism are designed in such a way that at least one light patch adjacent to the defective light patch features an increased corrective intensity progression in comparison to a non-defective state.

The particular advantage of the invention consists of the illuminance or intensity being increased at the defective light patch such that the distance or contrast between the defective light patch, on the one hand, and the light patches adjacent to the same of the plurality of the other light patches that are further away from the defective light patch than the adjacent light patches being reduced, on the other. By increasing the illuminance level at the defective light patch, on the one hand, and simultaneous reduction in the contrast of the defective light patch to the adjacent light patches and the light patches arranged further away prevents the occurrence of a "black hole" in the light distribution. In doing so, the possibility of raising the illuminance to an excessive level at the adjacent light patches is accepted. In order to avoid a white rim arising around the defective light patch, the excessive level of illuminance or the contrast of the adjacent light patches to the light patches arranged further away is lower than a specified threshold.

In accordance with one refinement of the invention, the imaging unit and/or the optical unit are designed in such a way that a maximum intensity value of the respective light patches is formed by the mapping of merely one single light pixel. The intensity of the light patches thus depends on the radiance of a single light pixel such that it is simple to implement the control of a high resolution headlamp with a dynamic light distribution dependent on the traffic environment.

In accordance with a refinement of the invention, the imaging unit and/or the optical unit are designed in such a way that the light emitted by the light pixels generates in addition to a maximum intensity on a single light patch a reduced intensity on the light patches adjacent to the light patch. The light pixels are thus mapped by means of the optical unit to an excessive radiance section extending beyond the light patch that leads to an overlapping of the light emitted by the light patches in the illumination area. This overlapping is used to increase the illuminance level of the defective light patch, where each instance of excessive radiance of a further adjacent light patch increases the illuminance level of the defective light patch and thus the contrast of the defective light patch to the adjacent light patches and the light patches arranged further away is reduced.

In accordance with a refinement of the invention, the corrective light pixels are arranged adjacent to the defective light pixel such that preferentially the light pixels directly adjacent to the defective light pixel are actuated as corrective light pixels as compensation for the defective light pixel in order to generate an increased radiance that leads to an excessive level of illuminance an the light patches adjacent to the defective light patch.

In accordance with a preferential embodiment of the invention, the corrective mechanism are designed in such a way that several corrective light pixels are actuated. As an advantage, this leads to a summation of several second light portions at the defective light patch such that the increase in the illuminance at the defective light patch is larger than the excessive level of illuminance at the adjacent light patches. The excessive level of illuminance at the defective light patch is at least three times as high as the excessive level of illuminance at the adjacent light patches.

In accordance with a refinement of the invention, a defect identification device is provided for by means of which the presence of defective light pixels can be determined. As an advantage, it is thus possible to identify the defective light pixels and to initiate corresponding corrective measures.

In accordance with a first embodiment of the defect identification device, the defect identification device features a light sensor that identifies defective light patches in the light distribution either on a measuring screen or during operation of the vehicle. An evaluation device processes the sensor data of the light sensor and determines from the location of the defective light area of the light distribution the location of the defective light pixel. Corresponding actuation makes it possible to compensate for the dark place on the defective light patch.

In accordance with a further embodiment of the defect identification device, a defect measuring routine is provided for that can identify the defective light pixels by means of checking rated current and rated voltage of the respective light pixels. If, for example, the amount of a deviation of the amperage at the operating point of the light pixel is larger than a threshold, it may be concluded that this light pixel is defective. Such a defect measuring routine is preferentially integrated into the actuator unit, such that the complexity is reduced.

In accordance with a refinement of the invention, the imaging unit can feature a light source matrix field with a plurality of individually actuatable light sources (LEDs). Alternatively, the imaging unit can feature a light source unit and firstly a liquid crystal unit or secondly a light source unit and a micromirror unit, or a light source unit and secondly an LCOS (liquid crystal on silicon) unit. The liquid crystal unit or the micromirror unit or the LCOS unit feature in this respect the actuatable light pixels, by means of which the illumination area can be modulated pixelwise.

The special advantage of the inventive method consists of an excessive level of illuminance at a light patch adjacent to a defective light patch being able to create firstly a reduction in contrast of the defective light patch to the adjacent light patches and the light patches arranged further away on the one hand and an increase in the illuminance level in the defective light patch on the other hand, which significantly reduces or elimi-nates the perceptibility of small, dark holes in the light distribution.

BRIEF DESCRIPTION OF THE DRAWINGS

Reference is now made more particularly to the drawings, which illustrate the best presently known mode of carrying out the invention and wherein similar reference char-acters indicate the same parts throughout the views.

DETAILED DESCRIPTION OF THE INVENTION

Figure 1:
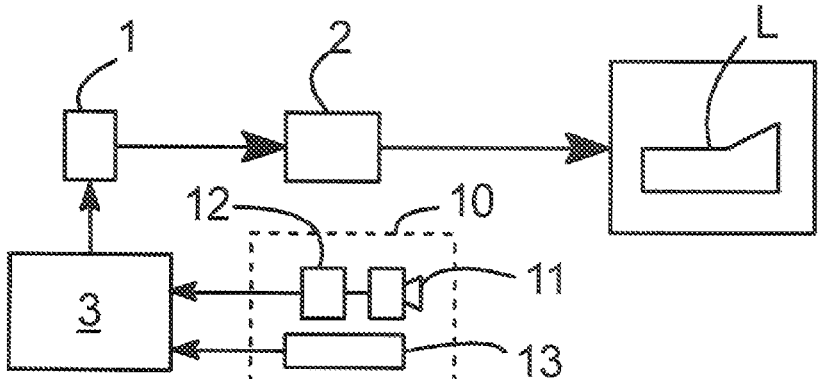
FIG. 1 illustrates a block diagram of an inventive head-lamp system.

A headlamp system for vehicles essentially consists of an imaging unit 1 that features a plurality of light pixels $P_{11}$, $P_{12}$ . . . $P_{nm}$ preferentially arranged in the form of a matrix that are arranged in rows Z1 through Zn and columns S1 through Sm. Furthermore, the headlamp system com-prises an optical unit 2 consisting, for example, of a number of lens elements by means of which the light emitted by the light pixels $P_{11}$, $P_{12}$ . . . $P_{nm}$ is mapped to a light distribution L in a vehicle environment. In the present sample embodi-ment, the light distribution L is designed as a low-beam light distribution. Furthermore, the headlamp system comprises an actuator unit 3 by means of which the imaging unit 1 can be actuated.

The imaging unit 1 can, for example, feature a large number of light sources arranged in the form of a matrix that can be individually actuated, for example LED light sources. By means of the actuator unit 3, the light sources can be switched on or off, or be dimmed, such that a specified light distribution is generated, for example city light, highway light or the like. In particular, it is possible to generate a glare-free high beam where the traffic objects recognized in the vehicle environment can be excluded in the high-beam distribution depending on their presence.

In accordance with an alternative embodiment of the invention, the imaging unit 1 can feature a liquid crystal unit as an LCD display or as an LCOS (liquid crystal on silicon) unit and a light source unit. In this respect, the liquid crystal elements arranged in the form of a matrix or pixelwise serve as shutter elements that either let light from the light source through or block it. In this respect, the liquid crystal ele-ments serve as light pixels as defined by the invention. As an alternative, the imaging unit 1 can feature a light source unit and a micromirror device (DMD), where the individual micromirror elements of the microelements are arranged in the form of a matrix or pixelwise in the range of several million so as to be pivotable. The micromirror elements have at least one On state, in which the light from the light source unit is directed onto the optical unit and at least one Off state in which the light emitted by the light source is absorbed.

The design of the imaging unit creates a high resolution headlamp or a high resolution headlamp system.

To generate the light distribution, one part or all light pixels $P_{11}, P_{12} \ldots P_{nm}$ of the light pixel field are actuated such that the specified light distribution L is generated. If the light pixels $P_{11}, P_{12} \ldots P_{nm}$ are in a switched-on state, these are mapped by means of the optical unit 2 to light patches $A_{11}, A_{12} \ldots A_{nm}$ of an illumination area 5 shown in FIG. 3. The illumination area 5 comprises a plurality of light patches $A_{11}, A_{12} \ldots A_{nm}$ arranged in the form of a matrix. Each light patch $A_{11}, A_{12} \ldots A_{nm}$ is allocated to a light pixel $P_{11}, P_{12} \ldots P_{nm}$. Thus, for example, in switched-on state, the light pixel $P_{22}$ is mapped by means of the optical unit 2 to the light patch $A_{22}$. The light pixel $P_{23}$ is mapped to the light patch $A_{23}$, etc.

Figure 2:
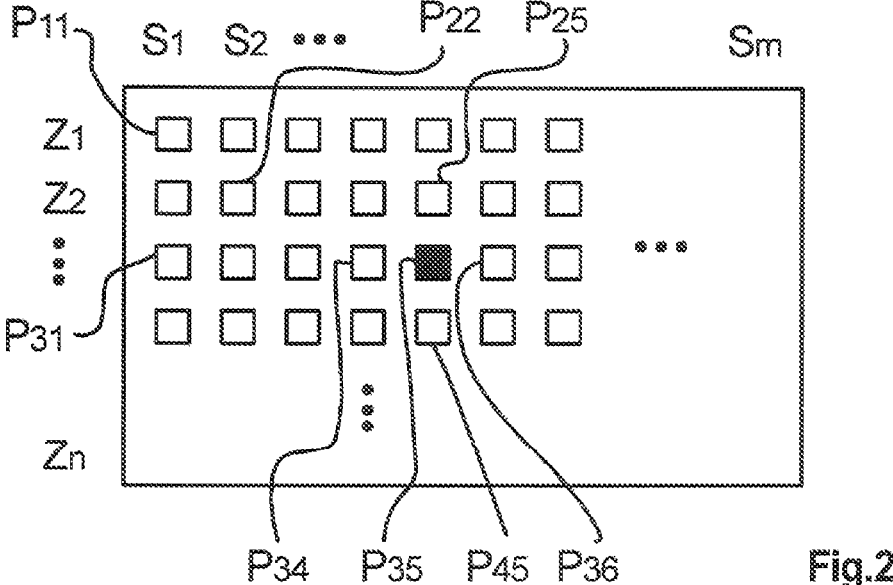
FIG. 2 illustrates a top view of a light pixel field.

FIG. 2 shows a section of a light pixel field with a plurality of light pixels $P_{11}, P_{12} \ldots P_{nm}$ arranged in the form of a matrix. For example, the pixel $P_{31}$ is located in the third row and the first column of the matrix. Let it be assumed that the pixel $P_{35}$ which is located in the third row and the fifth column is defective, i.e. cannot be caused to light up by the corresponding actuation.

The optical unit 2 is designed in such a way that the light pixels $P_{11}, P_{12} \ldots P_{nm}$ are not mapped according to a right angle function on the illumination area 5 but forming a bell curve 6 forming a maximum intensity $I_0$ that runs continuously along the path. The optical unit 2 leads to a local widening and/or diffusion of the light pixel imaging. As can be seen from FIG. 3, each light pixel $P_{11}, P_{12} \ldots P_{nm}$ is mapped in such a way that a core section 7 covering a light patch $A_{11}, A_{12} \ldots A_{nm}$ is formed with increased intensity and an excessive radiance 8 section covering adjacent light patches $A_{11}, A_{12} \ldots A_{nm}$ with lower intensity. The light pixel $P_{22}$ is thus mapped in such a way that the core section 7 (central section) of the light pixel $P_{22}$ hits light patch $A_{22}$, whereas the excessive radiance section 8 covers the light patches $A_{21}$ and $A_{23}$ adjacent in the row and light patches $A_{12}$ and $A_{32}$ adjacent in the column. The light patches $A_{11}$, $A_{13}, A_{31}, A_{33}$ are only partially covered or illuminated. The excessive radiance section 8 thus extends in the form of a ring around core section 7. An extent $d_S$ of a light section 9 formed by the core section 7 and the excessive radiance section 8 is smaller than the fourfold extent $d_F$ of the light patches $A_{11}, A_{12} \ldots A_{nm}$. In the present sample embodiment, the extent $d_S$ of light section 9 corresponds roughly to three times the extent de of light patches $A_{11}, A_{12} \ldots A_{nm}$.

Let it be assumed in the present sample embodiment that light patches $A_{11}, A_{12} \ldots A_{nm}$ appear as a square or a circle on a measuring screen and are of equal sizes.

Figure 3:
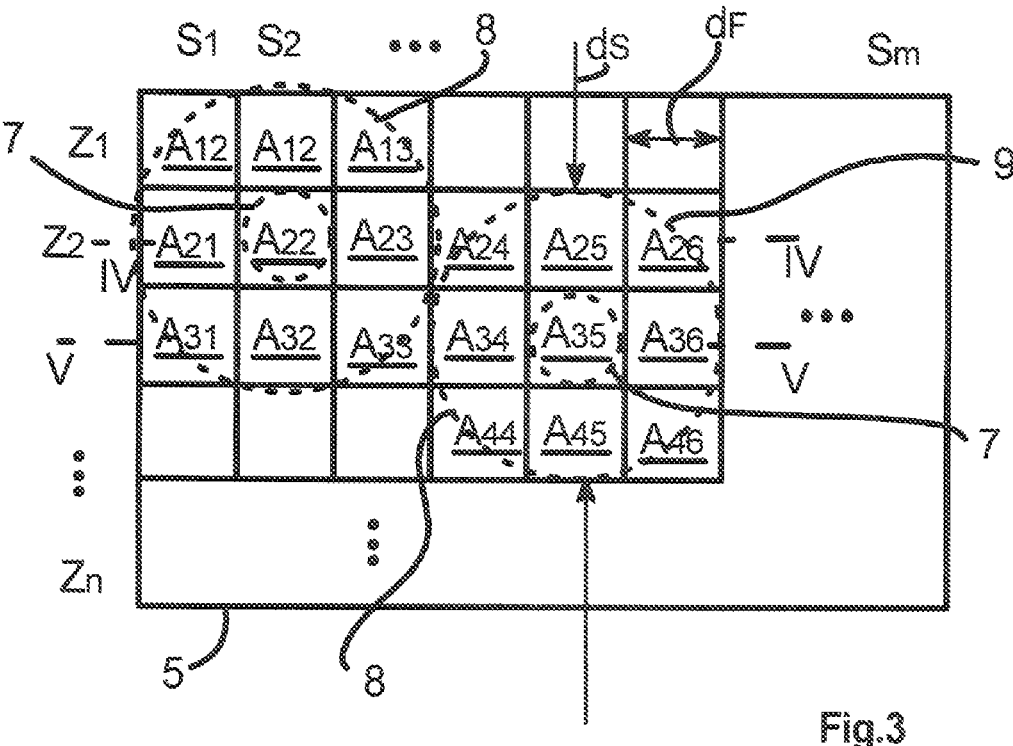
FIG. 3 illustrates a top view of an illumination area of a light distribution.

It can be seen from FIG. 3 that when light pixels $P_{11}, P_{12} \ldots P_{nm}$ are working correction the same maximum intensity $I_0$ is generated in each of the core sections 7. Adjacent light patches $A_{11}, A_{12} \ldots A_{nm}$ in switched-on state of the corresponding light pixels $P_{11}, P_{12} \ldots P_{nm}$ thus feature an equally strong illuminance or intensity.

The headlamp system further features a defect identification unit 10 by means of which the presence of defective or faulty light pixels $P_{11}, P_{12} \ldots P_{nm}$ can be detected. The defective light pixels referred to in the following are defective light pixels $P_{11}, P_{12} \ldots P_{nm}$. As an alternative, the distribution of the defective light pixels can also be provided by the manufacturer of the imaging unit 1, such that the defect identification unit 10 can be dispensed with.

In accordance with a first embodiment, the defect identification unit 10 can feature a light sensor 11, by means of which light patches $A_{11}, A_{12} \ldots A_{nm}$ appearing dark on a measuring screen can be identified as defective light patches. The light sensor 11 can, for example, take the form of a camera. The sensor signal provided by light sensor 11 is directed to an evaluation device 12 of the defect identification unit 10 in which the image data detected by light sensor 11 can be evaluated and determined by means of an allocation regulation from the location of the defective illuminated area of the light distribution L to the location of the defective light pixel ($P_{35}$) in the imaging unit 1.

In accordance with an alternative embodiment of the defect identification device 10, the defect identification evaluation of imaging unit 1 is performed. For this purpose, the defect measuring routine 10 features a defect measuring routine 13 that checks the light pixels $P_{11}, P_{12} \ldots P_{nm}$ for proper functioning. For example, light pixels $P_{11}, P_{12} \ldots P_{nm}$ can be actuated with a measuring voltage or a measuring current, preferentially rated current or rated voltage, in order to establish whether electrical values of the light pixel $P_{11}$, $P_{12} \ldots P_{nm}$ do not exceed a specified working range. If an electrical value, such as amperage, is outside of this range, it may be concluded that this light pixel is defective.

If a defective light pixel has been detected by means of the defect identification unit 10, for example light pixel $P_{35}$, the actuator unit 3 provides for corrective mechanism for compensating for or correcting the illumination for light patch $A_{35}$. In the present sample embodiment, four light pixels $P_{34}, P_{36}, P_{25}, P_{45}$ adjacent to the defective light pixel $P_{35}$ are actuated in such a way that light patches $A_{34}, A_{36}, A_{25}, A_{45}$ adjacent to the defective light patch $A_{35}$ are illuminated with an increased maximum corrective intensity value $I_1$ in comparison to the maximum intensity $I_0$. The maximum corrective intensity value $I_1$ is larger than the maximum intensity value $I_0$ of the light patches $A_{23}, A_{24}, A_{26}, A_{27}, A_{33}, A_{44}, A_{46}$, $A_{47}$ comparatively further away from the defective light patch $A_{35}$ or the light patches whose adjacent light patch is not allocated a defective light pixel.

Figure 4:
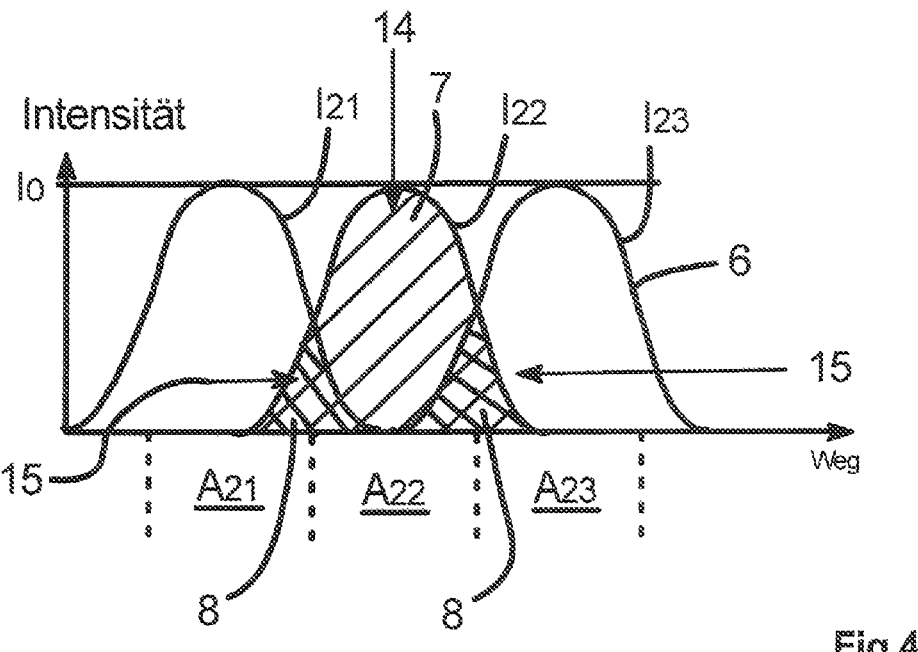
FIG. 4 illustrates an intensity distribution of light patches along a side section IV-IV in FIG. 3.

FIG. 4 shows the intensity distributions 121, 122, 123 of light patches $A_{21}, A_{22}, A_{23}$, to which non-defective light pixels $P_{21}, P_{22}, P_{23}$ are allocated or on which non-defective light pixels $P_{21}, P_{22}, P_{23}$ are mapped. The intensity distributions $I_{21}, I_{22}, I_{23}$ are identical in form, where, due to the excessive radiance of the mapped light onto adjacent light patches, each of the light patches features a first light portion 14 that is generated by the mapping of the same allocated light pixel, and a second light portion 15, that is generated by the light patches shining into the adjacent light patches. In the present sample embodiment, the illumination of the light patch $A_{22}$ comprises the first light portion 14 hatched in one direction under the intensity curve $I_{22}$ and the second light portion 15 arranged hatched in the opposite direction, that results from the adjacent intensity curves $I_{21}$ and $I_{23}$. The overlapping or excessive radiance of the mapped light patches onto adjacent light patches is exploited by the invention in this respect, as described in the following.

Figure 5:
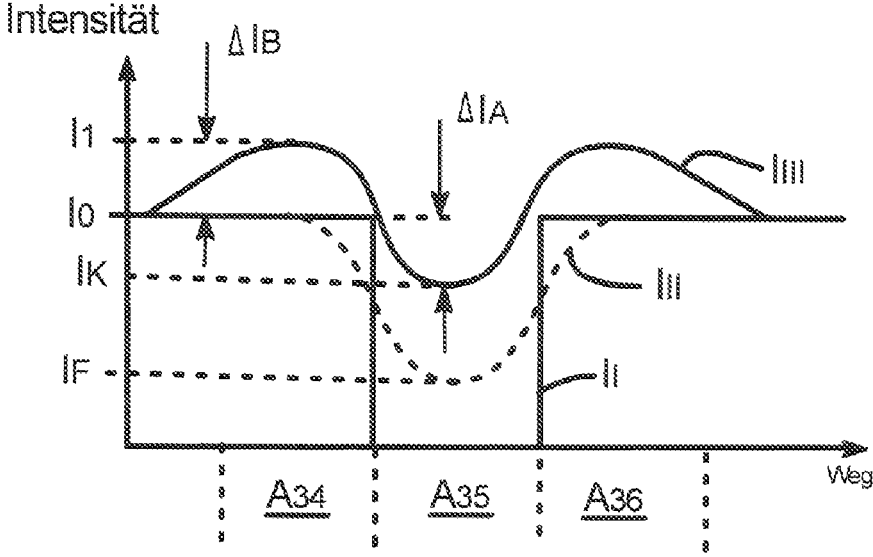
FIG. 5 illustrates an intensity distribution of light patches along a side section V-V in FIG. 3.

FIG. 5 shows three intensity progressions $I_I, I_{II}, I_{III}$ of the adjacent light patches $A_{24}, A_{35}, A_{36}$ in the event of the presence of the defective light patch $A_{35}$. The intensity progression $I_I$ shows the idealized case in which no excessive radiance of adjacent light patches by the light pixels takes place. In this case, the intensity in the defective light pixel field $A_{35}$ would be zero, whereas the intensity in the adjacent correct light patches is $I_0$. The dotted intensity progression $I_{II}$ corresponds to an actuation of the light pixels $P_{34}, P_{36}$ in the non-defective state of the light pixel $P_{35}$, i.e. if light pixel $P_{35}$ were not defective. A third intensity progression $I_{III}$ corresponds to the intensity of the light pixels $A_{34}$ and $A_{36}$ in the corrective state (defective case of light pixel $P_{35}$), i.e. light pixel $P_{35}$ being faulty. In this respect. the light patches $A_{25}$, $A_{34}$, $A_{36}$, $A_{45}$ adjacent to the defective light patch $A_{35}$ an increased intensity progression $I_{III}$ with the maximum corrective intensity value $I_1$. As the corrective light pixels $P_{25}$, $P_{34}$, $P_{36}$, $P_{45}$ are responsible for illumination of the adjacent light patches $A_{25}$, $A_{34}$, $A_{36}$, $A_{45}$ with their excessive radiance sections 8 also illuminate the defective light patch $A_{35}$, an increase in the intensity progression or the illuminance progression takes place in the defective light patch $A_{35}$. In comparison to a non-defective state of the light pixel $P_{35}$, a fourfold increase in intensity or illuminance takes place, where, in the defective light patch $A_{35}$ a minimum intensity $I_K$ is generated, which is significantly larger than a minimum intensity $I_F$ without correction. The minimum intensity $I_K$ of the defective light patch $A_{35}$ is greater than the minimum intensity $I_F$ in the case of non-correction. Furthermore, the excessive radiance in the adjacent light patch is smaller than the increase in the intensity in the defective light patch $A_{35}$. Therefore, in addition to the increase in illuminance in the defective light patch $A_{35}$, this gives rise to a reduction in the contrast between the defective light patch $A_{35}$ and the adjacent light patches $A_{25}$, $A_{34}$, $A_{36}$, $A_{45}$, on the one hand, and a larger reduction in the contrast to the light patches $A_{31}$, $A_{32}$, $A_{33}$ . . . arranged further away in comparison to the adjacent light patches $A_{25}$, $A_{34}$, $A_{36}$, $A_{45}$.

$$I_1 - I_K < I_0 - I_F$$

where $I_1$ is the maximum corrective intensity of the adjacent light patches $A_{25}$, $A_{34}$, $A_{36}$, $A_{45}$, $I_K$ the minimum corrective intensity in the defective light patch $A_{35}$ with correction, $I_F$ minimum intensity in the defective light patch $A_{35}$ without correction, $I_0$ maximum intensity of the non-defective light patch $A_{22}$, $A_{23}$, $A_{24}$ . . . , that connect to the adjacent light patches $A_{23}$, $A_{34}$, $A_{36}$, $A_{45}$, Furthermore, the following applies: $I_0 - I_K = \Delta I_A < S_A$ The difference $\Delta I_A$ is smaller than a specified threshold value $S_A$. The threshold value $S_A$ defines the minimum illuminance in the defective light patch $A_{35}$, so that the light patch $A_{35}$ is not perceived as a black hole.

Furthermore, the following applies: $I_1 - I_0 = \Delta I_B < S_B$

The excessive intensity level $\Delta I_B$ that represents the difference between $I_1$ and $I_0$, is smaller than a threshold value $S_B$. The threshold value $S_B$ states a maximum increase excessive radiance such that the excessively illuminated adjacent light patches $A_{25}$, $A_{34}$, $A_{36}$, $A_{45}$ do not lead to an undesired bright ring or rim around the defective light patch $A_{35}$. The threshold value $S_B$ thus limits the intensity difference to the light patches that are arranged on a different side to the defective light patch $A_{35}$.

After detecting the location of the defective light pixel $A_{35}$, the corrective light pixels $P_{25}$, $P_{34}$, $P_{36}$, $P_{45}$, that are preferentially arranged adjacent to the defective light pixel $P_{35}$ are actuated by the actuator unit 3 at a higher power such that the excessive brightness shown in FIG. 5 occurs with the light patches adjacent to the defective light patch $A_{35}$, which is accompanied at the same time by an increase in the brightness in the defective light patch $A_{35}$.

LIST OF REFERENCE NUMBERS

1 Imaging unit
2 Optical unit
3 Actuator unit
5 Illumination area
6 Bell curve

7 Core section
8 Excessive radiance section
9 Light section
10 Defect identification unit
11 Light sensor
12 Evaluation device
13 Defect measuring routine
14 1. Light portion
15 2. Light portion
$P_{11}$ . . . $P_{nm}$ Light pixels
$A_{11}$ . . . $A_{nm}$ Light patches
L Light distribution
$d_S$, $d_F$ Extent
$S_A$, $S_B$ Threshold
$\Delta I_B$ Intensity increase
$\Delta I_A$ Difference
$I_{21}$, $I_{22}$, $I_{23}$ Intensity distributions
$I_0$ Maximum intensity
$I_K$, $I_F$ Minimum intensity
$I_1$ Corrective intensity value
Z Rows
S Columns

We claim:

1. A headlamp system for vehicles, the headlamp system comprising:

an imaging unit;

an optical unit for generating a light distribution (L) that includes illuminated light patches, wherein the light patches are generated by mapping at least one corresponding light pixel of the imaging unit, wherein the optical unit is configured to form intensity progressions of the mapped light pixels as bell curves;

an actuator unit for actuating the imaging unit, wherein the actuator unit includes a corrective mechanism configured to actuate at least one corrective light pixel in response to a presence of a defective light pixel that cannot be mapped by the optical unit on a light patch, wherein actuation of the at least one corrective light pixel causes light patches adjacent to a defective light patch associated with the defective light pixel to have a changed corrective intensity progression in a corrective state in comparison to a non-corrective state;

wherein the optical unit is configured such that each light pixel is mapped in an excessive radiance section extending beyond the corresponding light patch, an intensity in the excessive radiance section being lower than an intensity within the respective light patch, the intensity of each of the light patches in the non-corrective state being formed by overlapping of a first light portion and a second light portion, wherein, for each of the light patches in the non-corrective state, the first light portion is generated by the corresponding light pixel mapped by the optical unit onto the light patch, and the second light portion is generated by the excessive radiance section of at least one light pixel mapped by the optical unit onto an adjacent light patch, wherein the second light portion of the defective light patch has a first intensity greater than zero when at least one light patch adjacent to the defective light patch is in the non-corrective state, and wherein the corrective mechanism is configured such that the at least one light patch adjacent to the defective light patch is in the corrective state and has a corrective intensity progression that is increased in comparison to the non-corrective state, and the second light portion of the defective light patch has a second intensity greater than the first intensity when the at least one light patch adjacent to the defective light patch is in the corrective state.

2. The headlamp system in accordance with claim 1, wherein the light patches are arranged in rows and columns to form an illumination area.

3. The headlamp system in accordance with claim 1, wherein the imaging unit and/or the optical unit are configured such that a maximum level of the intensity is arranged in a central area of the light patch.

4. The headlamp system in accordance with claim 1, wherein the excessive radiance section of the light pixel has an extent (dS) that is smaller than a fourfold extent (dF) of the light patches.

5. The headlamp system in accordance with claim 1, wherein the light patches are mapped at the same size on a measuring screen.

6. The headlamp system in accordance with claim 1, wherein the at least one corrective light pixel is arranged adjacent to the defective light pixel.

7. The headlamp system in accordance with claim 1, where a maximum intensity is arranged in the central area of the respective light patch.

8. The headlamp system in accordance with claim 1, wherein the corrective mechanism is configured such that several corrective light pixels arranged around the defective light pixel are actuated in the corrective state.

9. The headlamp system in accordance with claim 1, further comprising a defect identification unit configured to determine a presence of defective light pixels.

10. The headlamp system in accordance with claim 9, wherein the defect identification unit comprises:
  a light sensor that detects the light distribution (L) mapped on a measuring screen, and
  an evaluation unit that evaluates image data provided by the light sensor and, on the basis of an allocation regulation, determines from the location of the defective light patch of the light distribution (L) to the location of the defective light pixel in the imaging unit.

11. The headlamp system in accordance with claim 9, wherein the defect identification unit is configured to perform a defect measuring routine by which the light pixels are subjected to a measuring current and/or a measuring voltage, such that an error signal can be generated from measured values, the error signal defining the defectiveness of each light pixel on which the defect measuring routine is performed.

12. The headlamp system in accordance with claim 1, wherein the imaging unit comprises:
  (1) a plurality of individually actuatable light sources arranged in the form of a matrix;
  (2) a light source unit; and
  (3a) a liquid crystal device, or
  (3b) a micromirror device.

13. The headlamp system in accordance with claim 12, wherein the liquid crystal device includes a liquid crystal display (LCD) or a liquid crystal on silicon (LCoS) unit.

14. The headlamp system in accordance with claim 12, wherein the micromirror device includes a digital micromirror device (DMD).

15. A method for compensating for defective light pixels of a headlamp for vehicles, the method comprising the steps of:
  mapping light pixels via an optical unit to corresponding light patches of a light distribution (L) that, through overlapping, form an illumination field of the light distribution (L), wherein intensity progressions of the mapped light pixels form bell curves;
  actuating at least one of the light pixels that is mapped to a corresponding light patch adjacent to a defective light patch such that the light patch adjacent to the defective light patch is in a corrective state and any contrast between the defective light patch and the adjacent light patch is reduced in comparison to a non-corrective state of the light patch adjacent to the defective light patch;
  actuating the at least one of the light pixels such that the illuminance of the light patch adjacent to the defective light patch in the corrective state is greater than light patches farther away from the defective light patch that are in the non-corrective state; and
  actuating each of the light pixels such that the light pixels are mapped in excessive radiance sections extending beyond the corresponding light patches, an intensity of each of the light patches in the non-corrective state being formed by overlapping of a first light portion generated via the corresponding light pixel and a second light portion generated via the excessive radiance section of a light pixel mapped onto an adjacent light patch,
  wherein, for each light pixel, an intensity in the excessive radiance section is lower than the intensity within the corresponding light patch.

* * * * *